(12) United States Patent
Joyce et al.

(10) Patent No.: US 12,203,903 B2
(45) Date of Patent: Jan. 21, 2025

(54) METHODS AND APPARATUS TO PERFORM LOAD MEASUREMENTS ON HINGED DEVICES

(71) Applicant: Illinois Tool Works Inc., Glenview, IL (US)

(72) Inventors: Christopher Martin Joyce, Braintree, MA (US); Griffin Thomas Howard, Plymouth, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/470,107

(22) Filed: Sep. 19, 2023

(65) Prior Publication Data

US 2024/0230497 A1    Jul. 11, 2024

Related U.S. Application Data

(63) Continuation of application No. 17/220,587, filed on Apr. 1, 2021, now Pat. No. 11,761,867.

(Continued)

(51) Int. Cl.
  *G01N 3/34*   (2006.01)
  *G01N 3/04*   (2006.01)
  *G01N 3/20*   (2006.01)

(52) U.S. Cl.
  CPC ............... *G01N 3/34* (2013.01); *G01N 3/04* (2013.01); *G01N 2203/0023* (2013.01)

(58) Field of Classification Search
  CPC .. G06F 1/1632; G06F 3/04166; G06F 1/1618; G06F 3/03545; G01N 13/02;

(Continued)

(56) References Cited

U.S. PATENT DOCUMENTS

| 5,574,227 A | 11/1996 | Allan |
| 2019/0154555 A1 | 5/2019 | Han |

(Continued)

FOREIGN PATENT DOCUMENTS

| KR | 20060071462 | 6/2006 |
| KR | 101489667 | 2/2015 |

(Continued)

OTHER PUBLICATIONS

Desktop Model Endurance Test Machine Tension-Free™ Folding Clamshell-type, Yuasa System Co., Ltd., accessed on Apr. 1, 2021.

(Continued)

*Primary Examiner* — Brandi N Hopkins
(74) *Attorney, Agent, or Firm* — McAndrews, Held & Malloy, Ltd.

(57) ABSTRACT

An example hinged device flexible substrate testing system includes: a first plate comprising a first surface configured to hold stationary a first side of a hinged device under test; a second plate comprising a second surface configured to hold a second side of the hinged device under test; a first cam follower coupled to the second plate; a first drive arm configured to move the first cam follower to cause the second plate to rotate about a hinge pivot axis of the hinged device under test; an actuator configured to rotate the drive arm; and a load cell configured to measure loads on the first plate while the actuator moves the second plate.

20 Claims, 8 Drawing Sheets

Related U.S. Application Data (60) Provisional application No. 63/018,130, filed on Apr. 30, 2020.

(58) Field of Classification Search
CPC .. G01N 3/34; G01N 3/20; G01N 3/04; G01N 2203/0023; G01N 2203/0282; G01M 13/00; G01M 99/005; G01M 99/007; G11B 5/4853; G11B 5/4833; G11B 5/4806; G02F 1/1309
See application file for complete search history.

(56) References Cited

U.S. PATENT DOCUMENTS

2019/0391058 A1* 12/2019 Lee .................. G01N 3/04
2020/0400541 A1* 12/2020 Levesque .............. G01N 3/20

FOREIGN PATENT DOCUMENTS

| KR | 101961222 | 3/2019 |
| WO | 2020263502 | 12/2020 |

OTHER PUBLICATIONS

Int'l Search Report and Written Opinion AppIn No. PCT/US2021/027665 mailed Aug. 19, 2021.
Tension-Free™ Folding Clamshell-type, Dwg. No. BF0101SR-DR11MR, Yuasa System Co., Ltd., Aug. 23, 2019.
Tension-Free™ Folding Clamshell-type, Dwg. No. ET264001S0001-0, Yuasa System Co., Ltd. May 9, 2018.
European Examination AppIn No. 21725861.5 dated Nov. 5, 2024.

* cited by examiner

METHODS AND APPARATUS TO PERFORM LOAD MEASUREMENTS ON HINGED DEVICES

RELATED APPLICATIONS

The present application claims the benefit of U.S. Provisional Patent Application Ser. No. 63/018,130, filed Apr. 30, 2020, entitled "METHODS AND APPARATUS TO PERFORM LOAD MEASUREMENTS ON HINGED DEVICES." The entirety of U.S. Provisional Patent Application Ser. No. 63/018,130 is expressly incorporated herein by reference.

BACKGROUND

This disclosure relates generally to materials testing, and more particularly, to methods and apparatus to perform load measurements on flexible substrates.

Reliability testing for an assembly, or moving components of an assembly, may involve repetitively performing intended and/or unintended movements of the components to verify that the components and/or assembly reliably operates for a defined minimum number of cycles of the movements. For example, reliability testing of a flexible substrate may involve repeatedly flexing the substrate in one or more ways, while testing for continued operation of the device and/or monitoring various modes of failure.

SUMMARY

Methods and apparatus to perform load measurements on hinged devices are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Flexible specimens often include assemblies and/or devices that have constraint mechanisms, such as simple hinges, double hinges, elliptical mechanisms, and/or other forms of constraints. Conventional measurement systems are not capable of characterizing forces associated with flexible specimens that involve such constraint mechanisms, because conventional measurement systems are not able to fold such specimens without over-constraining the specimens (resulting in damage), and/or because the reaction forces produced by the constraint mechanisms are typically many orders of magnitude greater than the reaction forces produced by the flexible material specimen.

Disclosed example hinged device testing systems provide repetitive stress testing and/or load measurement for hinged devices, while reducing or minimizing additional stress induced on the hinged device by the hinged device testing system itself. For example, some disclosed hinged device testing systems allow the specimen to be folded by the system while allowing the constraint device(s) of the specimen (e.g., hinge(s)) to determine the exact folding path of the specimen, thereby testing the specimen in the same manner as in the eventual intended use of the specimen.

Some disclosed hinged device testing systems include fixturing that provides repetitive folding and unfolding of a hinged device, such as a hinged mobile electronic device (e.g., a smartphone). In some examples, the testing systems are configured such that the hinge of the hinged device controls a folding and unfolding path of a foldable substrate, while forces on the foldable substrate are measured. Disclosed examples configure the fixturing, such as guiding of the moving parts, such that the fixturing does not create additional force on the hinge(s) of the hinged device as the sides of the hinged device are folded together or unfolded.

In some examples, the hinged device testing systems include a translation linkage to limit forces on the device that are not in the direction measured using the hinged device testing system. As an example, a translation linkage may translate lateral forces on the measured side(s) of the hinged device to forces in the direction of measurement (e.g., forces normal to a face of the hinged device, forces associated with resistance of the hinge to folding, etc.).

Disclosed examples of the hinged device testing systems include a dynamic, or moving, portion, and a stationary, load measuring portion. Examples of the dynamic portion include a rotary shaft which articulates multiple drive arms. The drive arms each feature a slot in which a cam follower (e.g., a bearing) is free to travel radially along the drive arm. The bearings are each secured to a shared mounting plate that moves a portion of a hinged device that is attached to the mounting plate. The stationary, load measurement portion is affixed to a same base plate as the dynamic side. The stationary side features a static stationary mounting plate to which another portion of the hinged device is attached. In some examples, the stationary mounting plate is suspended above the base plate using parallel flexures. In addition to the parallel flexures, a load cell (e.g., including corresponding adapter components) connect the stationary mounting plate to the base plate.

In some examples, the stationary side also includes rigid mounting points, which are decoupled from the load measurement path, to which portions of the hinges may be attached to reduce or eliminate the forces of the hinges. By providing rigid mounting points for the constraint mechanisms of the specimen, disclosed examples are capable of highly sensitive measurements of the folding forces of the specimen because the reaction forces associated with the constraint mechanism are isolated from the load measurement.

Disclosed example hinged device testing systems are sufficiently versatile to accommodate a variety of constraint mechanisms, including hinges, double hinges, and mechanisms not yet contrived. Disclosed examples can accommodate different specimen sizes with little or no adjustment (e.g. 2 mm bends, 3 mm bends, etc.). Disclosed examples are capable of expansion to test multiple specimens at once by connecting the specimens to the same driveshaft. Furthermore, disclosed example testing systems are inexpensive.

Figure 1:
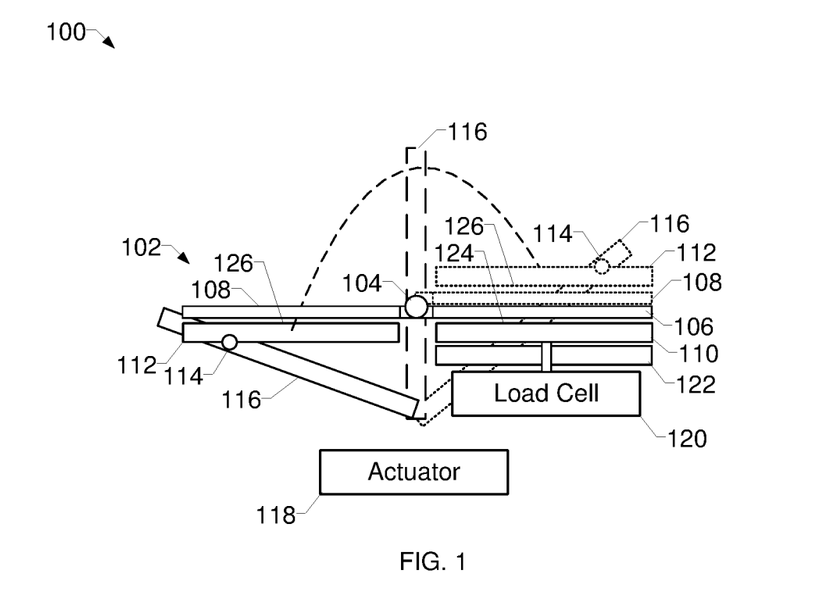
FIG. 1 is a block diagram of an example hinged device test system to perform mechanical property testing on a hinged device, in accordance with aspects of this disclosure.

FIG. 1 is a block diagram of an example hinged device test system 100 to perform mechanical property testing on a hinged device 102. The example hinged device 102 may be an electronic or other device having one or more hinges 104 allowing at least a first portion 106 and a second portion 108 of the hinged device 102 to at least partially fold. The system 100 of FIG. 1 is configured to repeatedly fold and unfold the hinged device 102 to measure forces associated with the folding and unfolding (e.g., resistive forces, spring forces, etc.). FIG. 1 illustrates the hinged device 102 in an unfolded or flat position (solid line) and folded position (dotted line).

The example system 100 includes a first plate 110, a second plate 112, one or more cam followers 114 coupled to the second plate 112, one or more drive arms 116, an actuator 118, one or more load cells 120, and a translation linkage 122. The system 100 may include additional features, such as structural support or framing, processing circuitry, communications and/or input/output (I/O) circuitry, and/or any other components.

The first plate 110 has a first surface 124 to which the first side 106 of the hinged device 102 is attached or affixed, and held stationary with respect to the first surface 124. The second plate 112 has a second surface 126 to which the second side 108 of the hinged device 102 is attached or affixed, and held stationary with respect to the second surface 126. The plates 110, 112 are separated by a gap, which is bridged by the hinge 104.

The drive arm(s) 116 move the corresponding cam follower(s) 114 to cause the second plate 108 to rotate about a pivot axis of the hinge 104 of the hinged device 102. The actuator 118 rotates the drive arm(s) 116 to cause the second plate 112 to move the second portion 108 of the hinged device 102 from the first position (shown in solid lines) toward the first portion 106 in the folded position (shown in broken lines). The drive arm(s) 116 allow motion of the cam follower(s) 114 along the length of the drive arm(s) 116 so that the system 100 limits or eliminates force on the first portion 106 of the hinged device 102 by the weight of the second plate 112 or the drive arm(s) 116, such that the measured force on the first portion 106 of the hinged device 102 is completely determined by the actuation of the hinge 104.

In some examples, the actuator 118 may be a motor attached to the drive arm(s) 116 to rotate the drive arm(s) 116 about a pivot of the drive arm(s) 116.

The load cell 120 measures loads on the first plate 110 while the actuator 118 moves the second plate 112. In particular, the load cell 120 measures stress (e.g., folding force) on the hinged device 102 as the hinged device 102 is folded by measuring load exerted by the first side 106 of the hinged device 102 onto the first plate 110.

The translation linkage 122 limits movement of the first plate 110 in directions other than the direction in which the load cell 120 is loaded by the first plate 110. For example, if the load cell 120 is configured to measure loads in a direction perpendicular to the plane of the first surface 122, the translation linkage 122 limits movement of the first plate 110 in directions parallel to the plane of the first surface 124 while permitting load to be transferred from the first plate 110 to the load cell 120. An example translation linkage 122 may include one or more four-bar linkages coupled to a frame that is fixed with respect to the load cell 120. In some examples, the translation linkage 122 is further limited in a direction toward the load cell 120 to prevent overloading of the load cell 120. For example, a stopping point may be attached to the frame to prevent movement of the four-bar linkage(s) and the first plate 110 toward the load cell 120 beyond the stopping point.

In operation, the example load cell 120 may be biased or offset after securing the hinged device 102 to the first plate 110 and the second plate 112 to subtract a preload from the test measurements. For example, the preload on the load cell 120 may occur due to the weight of the first plate 110, the weight of translation linkage 122, and/or the weight of the first side 106 and/or the hinge 104 of the hinged device 102 on the first plate 110. By determining the preload on the load cell 120, the load cell 120 can be calibrated or offset to measure the stress on the hinged device 102 during folding and unfolding.

Figure 2:
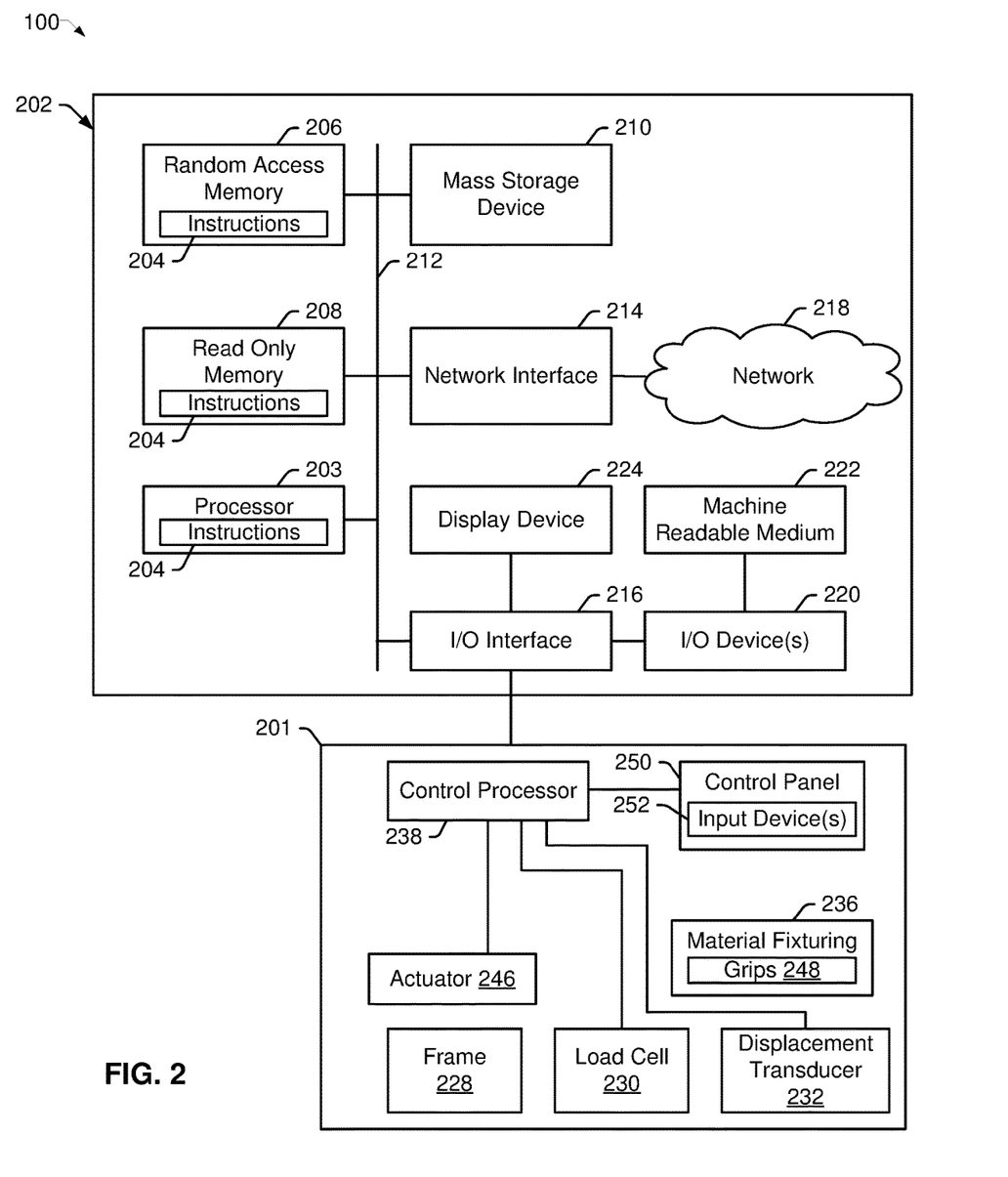
FIG. 2 is a block diagram of an example implementation of the hinged device test system of FIG. 1.

FIG. 2 is a block diagram of an example implementation of the hinged device test system 100 of FIG. 1. As illustrated in FIG. 2, the hinged device test system 100 includes a test fixture 201 and a computing device 202.

The example computing device 202 may be a general-purpose computer, a laptop computer, a tablet computer, a mobile device, a server, an all-in-one computer, and/or any other type of computing device. The computing device 202 of FIG. 2 includes a processor 203, which may be a general-purpose central processing unit (CPU). In some examples, the processor 203 may include one or more specialized processing units, such as FPGA, RISC processors with an ARM core, graphic processing units, digital signal processors, and/or system-on-chips (SoC). The processor 203 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 203, the RAM 206, the ROM 208, the mass storage device 210, a network interface 214, and/or an input/output interface 216.

An example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

An example I/O interface 216 of FIG. 2 includes hardware, firmware, and/or software to connect one or more input/output devices 220 to the processor 203 for providing input to the processor 203 and/or providing output from the processor 203. For example, the I/O interface 216 may include a graphics-processing unit for interfacing with a display device, a universal serial bus port for interfacing with one or more USB-compliant devices, a Fire Wire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 202 may access a non-transitory machine-readable medium 222 via the I/O interface 216 and/or the I/O device(s) 220. Examples of the machine-readable medium 222 of FIG. 8 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The test fixture 201 is coupled to the computing device 202. In the example of FIG. 2, the test fixture 201 is coupled to the computing device via the I/O interface 216, such as via a USB port, a Thunderbolt port, a FireWire (IEEE 1394) port, and/or any other type serial or parallel data port. In some examples, the test fixture 201 is coupled to the network interface 214 and/or to the I/O interface 216 via a wired or wireless connection (e.g., Ethernet, Wi-Fi, etc.), either directly or via the network 218.

The test fixture 201 includes a frame 228, a load cell 230, material fixtures 236, and a control processor 238. The frame 228 provides rigid structural support for the other components of the test fixture 201 that perform the test. The load cell 230 may implement the load cell 120 of FIG. 1, and measures force applied to a material under test (e.g., the hinged device 102) by an actuator 246 via grips 248 (e.g., the plates 110, 120).

The actuator 246 applies force to the material under test and/or forces displacement of the material under test, while the grips 248 grasp or otherwise couple the material under test to the actuator 246.

Example actuators that may be used to provide force and/or motion of a component of the test fixture 201 include electric motors, pneumatic actuators, hydraulic actuators, piezoelectric actuators, relays, and/or switches. While the example test fixture 201 uses a motor, such as a servo or direct-drive linear motor, other systems may use different types of actuators. For example, hydraulic actuators, pneumatic actuators, and/or any other type of actuator may be used based on the requirements of the system.

The example grips 236 include platens, clamps, and/or other types of fixtures, depending on the mechanical property being tested and/or the material under test. The grips 236 may be manually configured, controlled via manual input, and/or automatically controlled by the control processor 238.

The test system 100 may further include one or more control panels 250, including one or more input devices 252. The input devices 252 may include buttons, switches, and/or other input devices located on an operator control panel. For example, the input devices 252 may include buttons that control the actuator 242 to jog (e.g., position) the grips 248 to a desired position, switches (e.g., foot switches) that control the grips 248 to close or open (e.g., via another actuator), and/or any other input devices to control operation of the testing test fixture 201.

The example control processor 238 communicates with the computing device 202 to, for example, receive test parameters from the computing device 202 and/or report measurements and/or other results to the computing device 202. For example, the control processor 238 may include one or more communication or I/O interfaces to enable communication with the computing device 202. The control processor 238 may control the actuator 246 to move in a given direction and/or to control the speed of the actuator 246, control the fixture(s) 236 to grasp or release a material under test, and/or receive measurements from the displacement transducer 232, the load cell 230 and/or other transducers.

The example control processor 238 is configured to implement a repetitive motion testing process in which a test specimen (e.g., the hinged device 102) is subjected to testing in the test fixture 201. For example, to measure stress on the hinged device 102 during or after a series of folding and unfolding motions, the control processor 238 controls the actuator 246 to move the grips 248 (e.g., the first and second plates 110, 112) while monitoring the load cell 230 to measure stress on the hinged device 102. In some examples, the control processor 238 monitors a motor encoder of the actuator 246 to determine a folding angle and/or establish a folding degree-per-pulse ratio.

Figure 3:
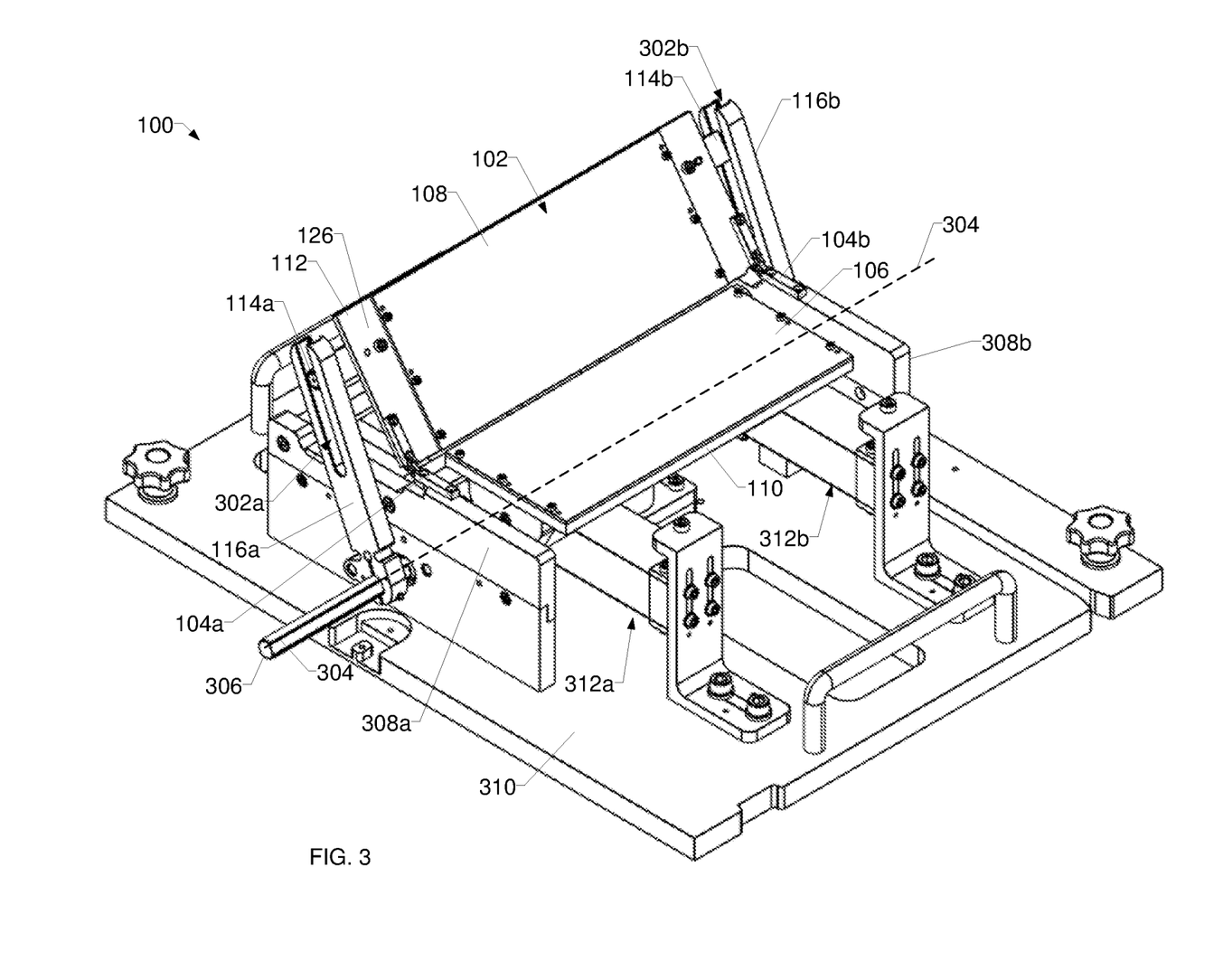
FIG. 3 is a perspective view of an example implementation of the hinged device test system of FIG. 1.
Figure 4A:
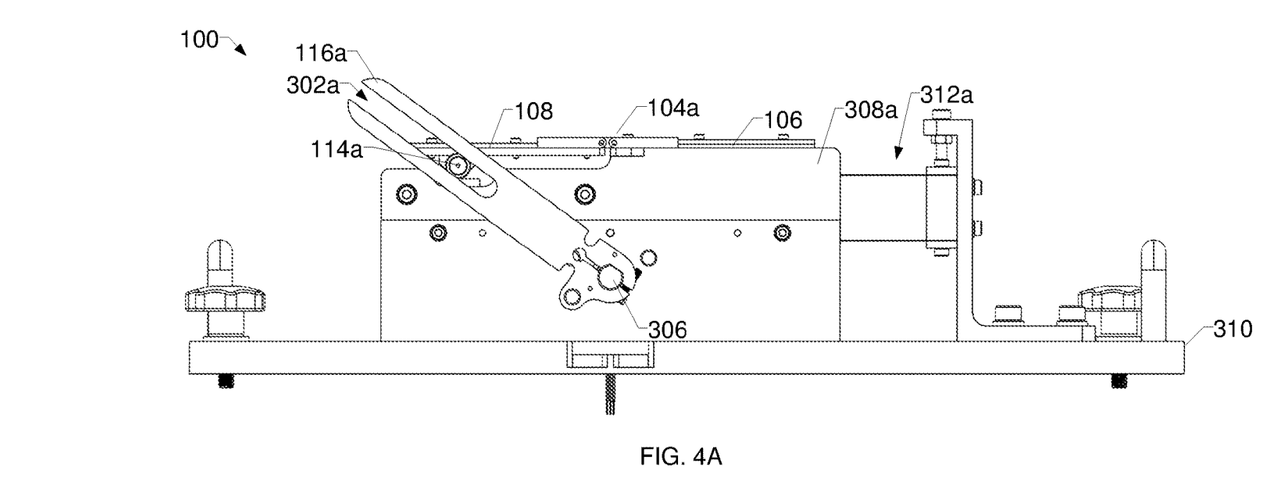
FIG. 4A is a front elevation view of the example hinged device test system of FIG. 3 in which the hinged device is in an opened or unfolded position.
Figure 4B:
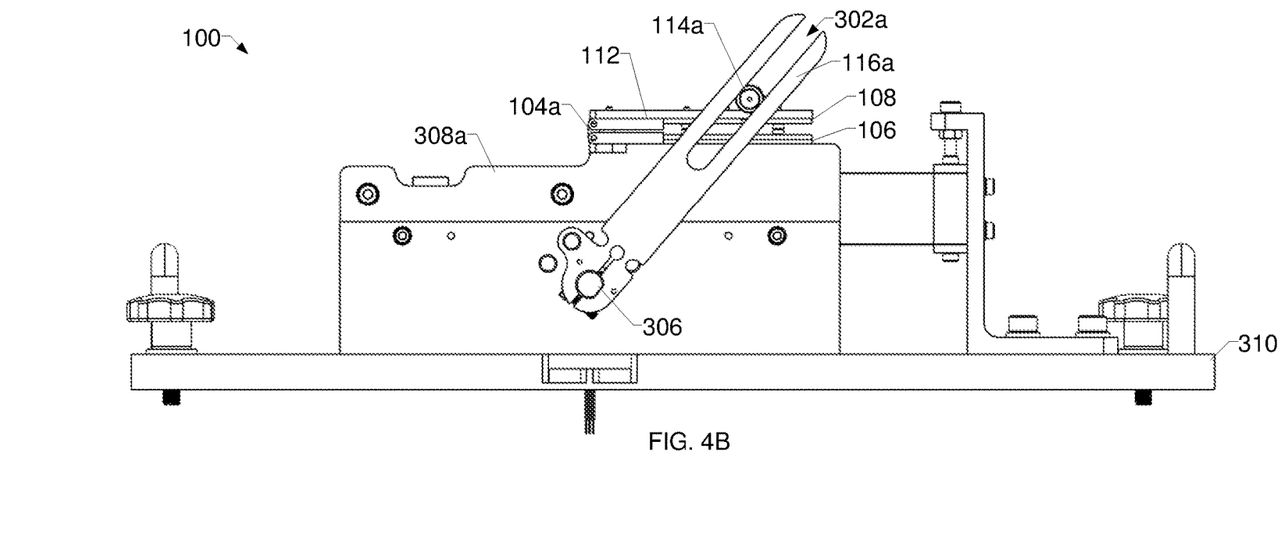
FIG. 4B is a front elevation view of the example hinged device test system of FIG. 3 in which the hinged device is in a closed or folded position.

FIG. 3 is a perspective view of an example implementation of the hinged device test system 100 of FIG. 1. The example view of FIG. 3 illustrates the hinges 104 and the first and second portions 106, 108 of an example hinged device 102 attached to the hinged device test system 100. FIG. 3 further illustrates two example drive arms 116a, 116b configured to move the second plate 112 via corresponding cam followers 114a, 114b. FIG. 4A is an elevation view of the example hinged device test system 100 of FIG. 3 in which the hinged device 102 is in an opened or unfolded position. FIG. 4B is an elevation view of the example hinged device test system 100 of FIG. 3 in which the hinged device 102 is in a closed or folded position.

As illustrated in FIGS. 3, 4A, and 4B, the drive arms 116a, 116b include respective slots 302a, 302b extending radially from a pivot axis 304 of the drive arms 116a, 116b. In the example of FIG. 3, the actuator 118 actuates (e.g., rotates) the drive arms 116a, 116 via an axle 306 defining the pivot axis 304. The slots 302a, 302b guide the respective cam followers 114a, 114b as the drive arms 116a, 116 are rotated, while permitting the cam followers 114a, 114b to move freely along the lengths of the slots 302a, 302b as the drive arms 116a, 116b are rotated. The cam followers 114a, 114b are coupled to the second plate 112 via a support axle 314 coupling the cam followers 114a, 114b.

The example hinged device test system 100 of FIGS. 3, 4A, and 4B limit the loads from the hinges 104a, 104b on the load cell 120 via a hinge support plates 308a, 308b that are coupled to a base plate 310. During testing, the hinge support plates 308a, 308b hold respective first sides of the hinges 104a, 104b separately from the first plate 110. As a result, resistive forces by the hinges 104a, 104b created during folding and unfolding of the hinged device 102 are transferred to the hinge support plates 308a. 308b instead of being transferred to the first plate 110 and the load cell 120.

The example translation linkage 122 includes flexures 312a, 312b, which are coupled to the base plate 310. The flexures 312a, 312b support the first plate 110 and permit transfer of load from the hinged device 102 to the load cell 120. The flexures limit 312a, 312b movement of the first plate 110 in directions other than the direction in which the load cell 120 measures force.

While the examples disclosed above include the entire hinged device 102, in other examples the hinges 104a, 104b may be coupled directly to the first and second plates 110, 112, without the first and second portions 106, 108 of the hinged device 102. Additionally or alternatively, while two drive arms 116*a*, 116*b* are illustrated in FIG. 3, other examples may include one drive arm or three or more drive arms.

Figure 5:
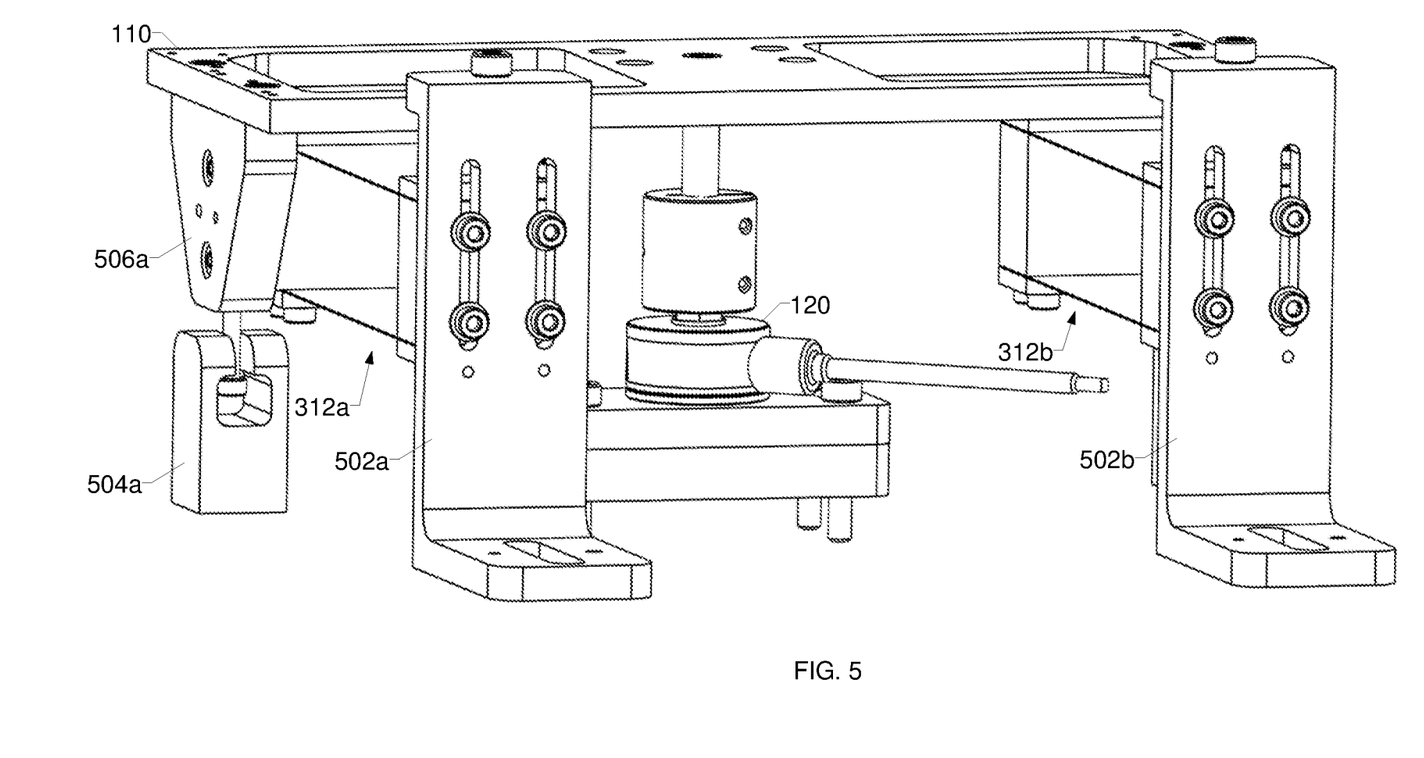
FIG. 5 is a more detailed view of the example first plate, the flexures, and the load cell.

FIG. 5 is a more detailed view of the example first plate 110, the flexures 312*a*, 312*b*, and the load cell 120. The example flexures 312*a*, 312*b* are supported by brackets 502*a*, 502*b*, which are coupled to the base plate 310.

The flexures 312*a*, 312*b* include strips of metal attached to the brackets 502*a*, 502*b* and the first plate 110 to support the weight of the first plate 110. The first plate 110 is also coupled to the load cell 120 to transfer loads to the load cell 120 for measurement.

To avoid overloading of the load cell 120, the first plate 110 includes a stopping point configured to prevent the first plate 110 from traveling toward the load cell 120 beyond the stopping point. In the illustrated example, the stopping point is implemented using stopping blocks 504*a*, 504*b*. Support brackets 506*a*, 506*b* couple the flexures 312*a*, 312*b* to the first plate 110. The blocks 504*a*, 504*b* are configured to stop support brackets 506*a*, 506*b* that couple the flexures 312*a*, 312*b* to the first plate 110 after a predetermined amount of travel of the support brackets 506*a*, 506*b* (e.g., a predetermined amount of load on the first plate 110).

Figure 6:
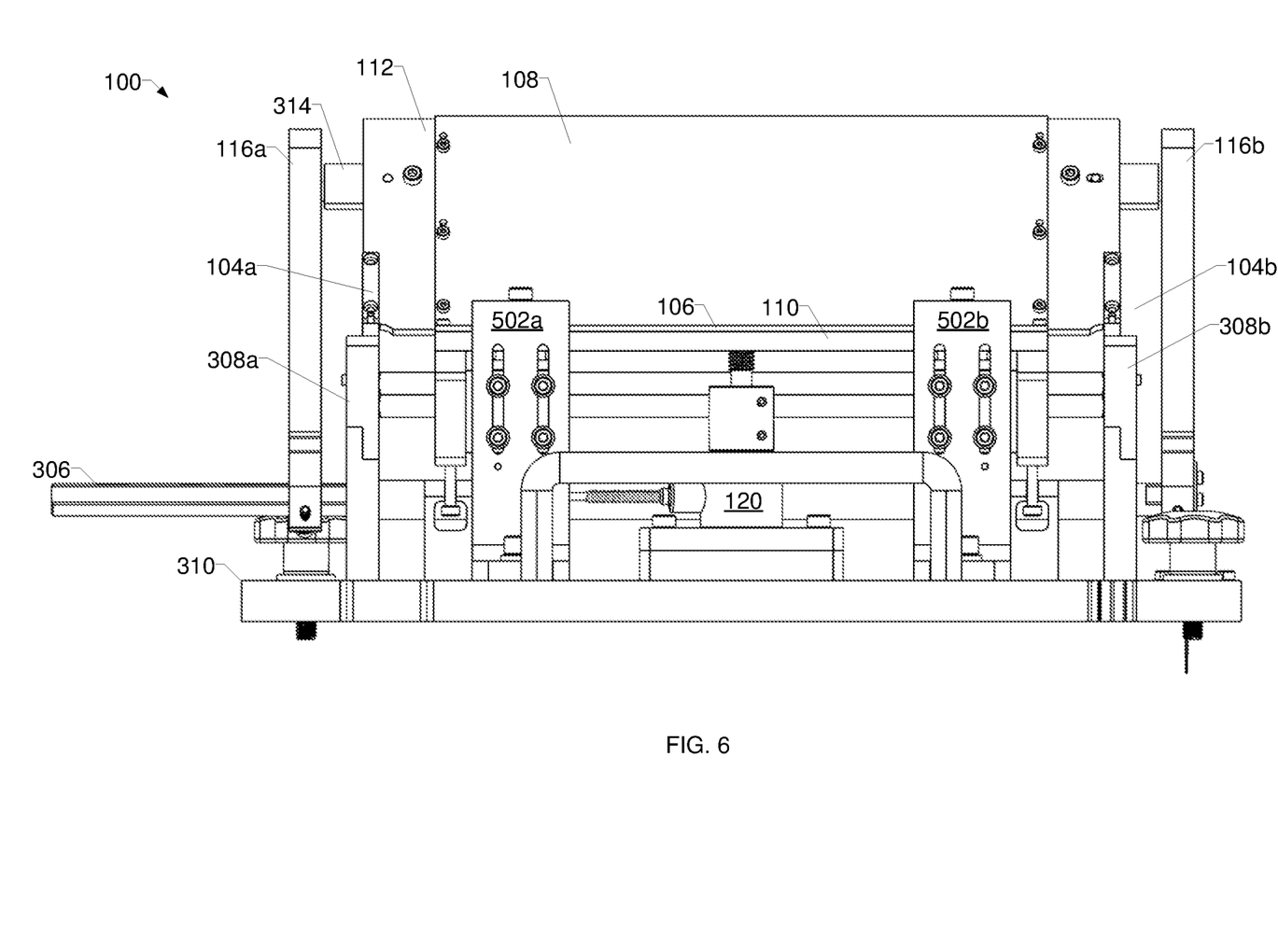
FIG. 6 is a side elevation view of the example hinged device test system of FIG. 3.
Figure 7:
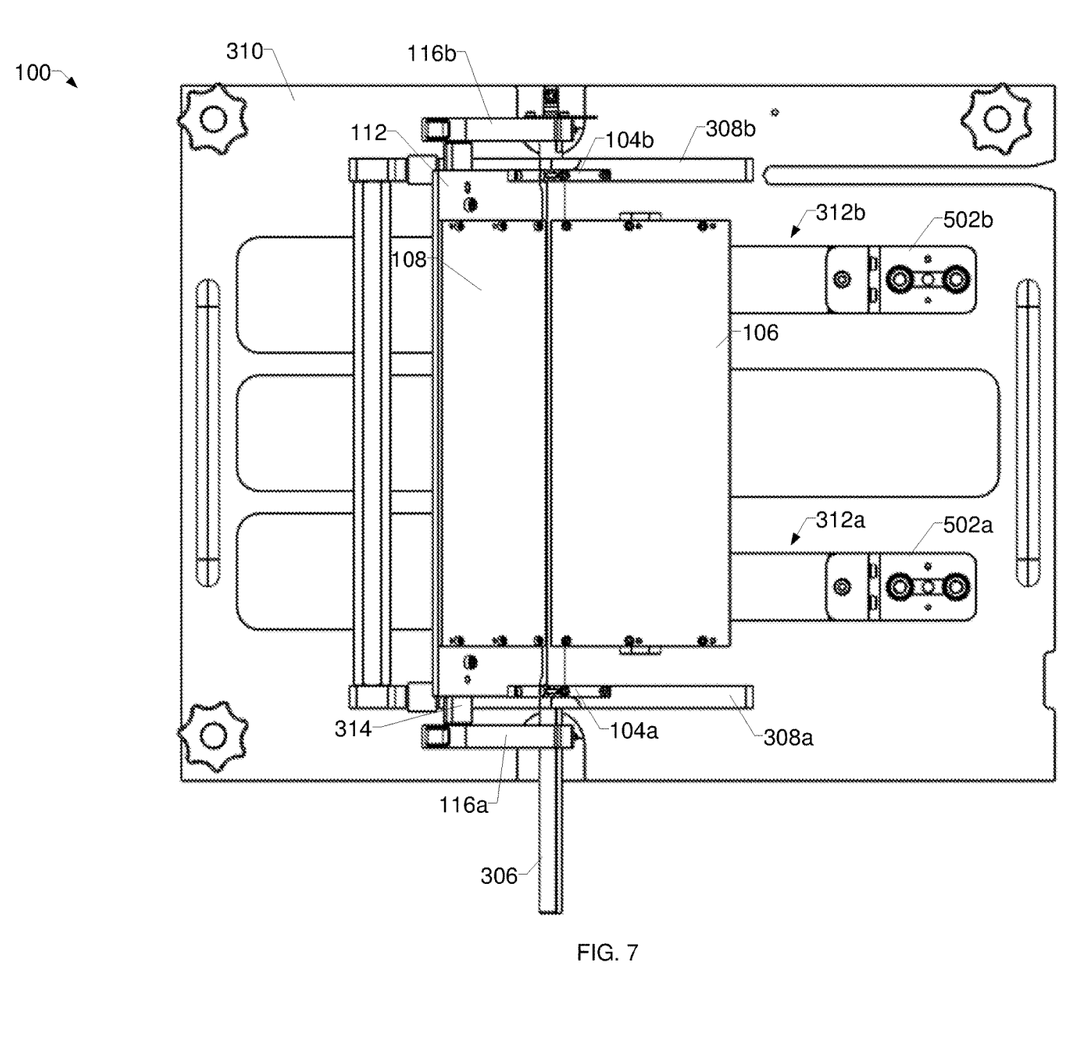
FIG. 7 is a plan view of the example hinged device test system of FIG. 3.

FIG. 6 is a side elevation view of the example hinged device test system 100 of FIG. 3. FIG. 7 is a plan view of the example hinged device test system 100 of FIG. 3.

Figure 8:
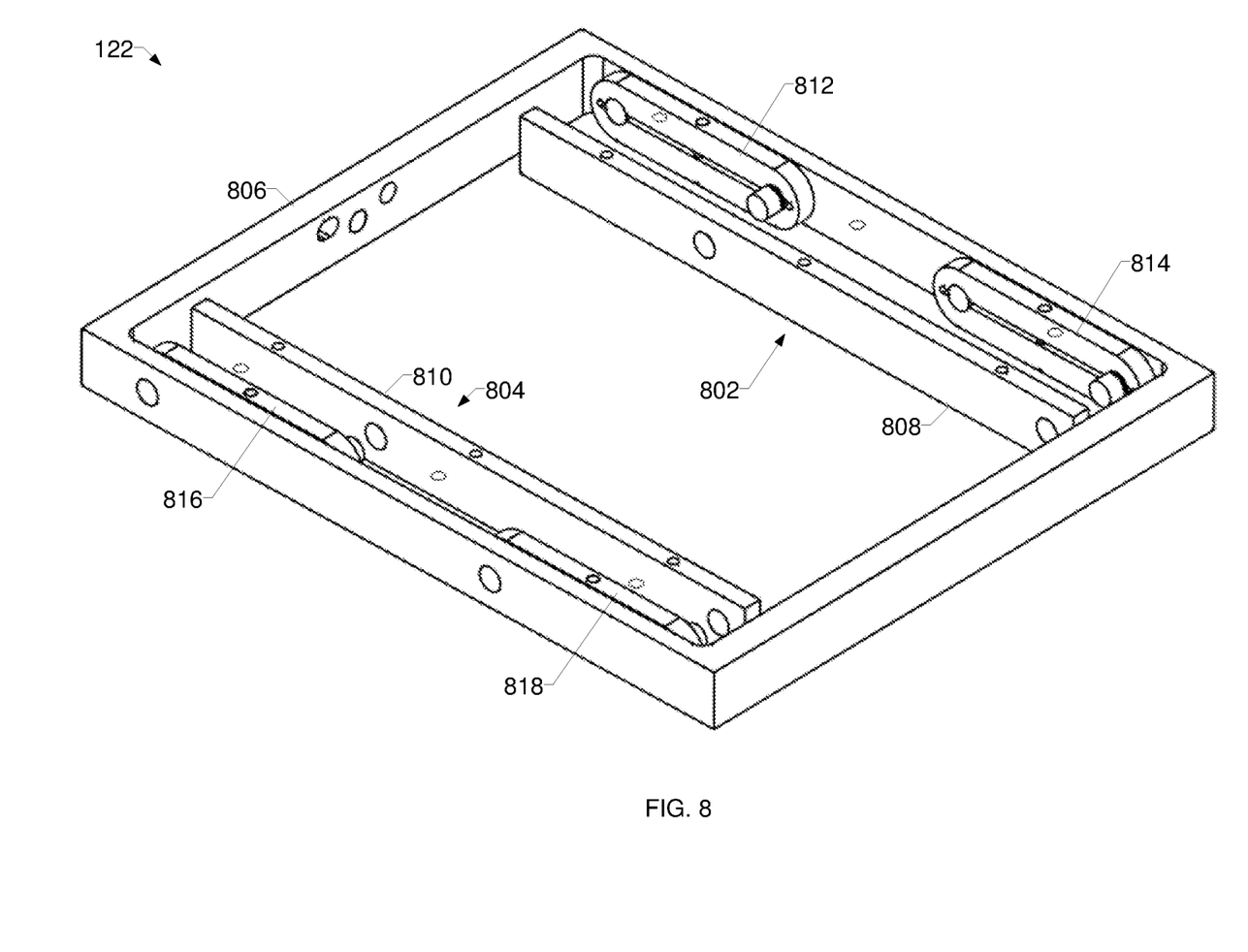
FIG. 8 illustrates a partially exploded view of another example implementation of the translation linkage of FIG. 1.

FIG. 8 illustrates a partially exploded view of another example implementation of the translation linkage 122 of FIG. 1. The example translation linkage 122 of FIG. 8 includes a first four-bar linkage 802, a second four-bar linkage 804, and a frame 806. The frame 806 is coupled to be stationary with respect to the base plate 310 (e.g., via the hinge support plates 308*a*, 308*b*, or another structure). The frame 806 and the load cell 120 are stationary with respect to each other.

Inner linkages 808, 810 of the four-bar linkages 802, 804 are coupled to the first plate 110. Intermediate linkages 812, 814, 816, 818 couple the inner linkages 802, 804 to the frame 806. Similarly to the flexures 312*a*, 312*b* of FIG. 3, the first and second four-bar linkages 802, 804 limit movement of the first plate 110 in directions parallel to the surface of the first plate 110 on which the first part 106 of the hinged device 102 is mounted, while permitting loads from the first plate 110 to be transferred to the load cell 120 (e.g., via an extension post 308 coupled to the load cell 120) in a direction perpendicular to the surface of the first plate 110.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A hinged device testing system, comprising:
a first plate comprising a first surface configured to hold stationary a first side of a hinged device under test;
a second plate comprising a second surface configured to hold a second side of the hinged device under test;
a first cam follower coupled to the second plate;
a first drive arm configured to move the first cam follower to cause the second plate to rotate about a hinge pivot axis of the hinged device under test, the first drive arm comprising a slot extending radially from a pivot axis of the first drive arm, wherein the first cam follower moves within the slot while the second plate rotates;
an actuator configured to rotate the first drive arm; and
a load cell configured to measure loads on the first plate while the actuator moves the second plate, wherein the hinged device testing system is configured to stop the first plate after a predetermined amount of load has been applied to the first plate.

2. The hinged device testing system of claim 1, further comprising:
   a second cam follower coupled to the second plate; and
   a second drive arm configured to move the second cam follower to further cause the second plate to rotate about the hinge pivot axis of the hinged device under test.

3. The hinged device testing system of claim 1, further comprising control circuitry configured to control the actuator to move the second plate in at least one of a first direction to fold the hinged device under test or a second direction to unfold the hinged device under test.

4. The hinged device testing system of claim 3, wherein the control circuitry is further configured to determine at least one of a folding angle or a folding degree-per pulse ratio.

5. The hinged device testing system of claim 1, further comprising a translation linkage configured to limit movement of the first plate in directions parallel to a plane of the first surface and to transfer loads from the first plate in a direction perpendicular to the plane of the first surface, the translation linkage comprising:
   a frame that is fixed with respect to the load cell; and
   a four-bar linkage coupled to the frame and the first plate.

6. The hinged device testing system of claim 1, wherein the hinged device testing system defines a stopping point of the first plate configured to prevent the first plate from traveling in a direction perpendicular to a plane of the first surface beyond the stopping point.

7. The hinged device testing system of claim 6, further comprising a stopping block which defines the stopping point.

8. The hinged device testing system of claim 1, further comprising a first hinge support plate configured to hold a first side of the first hinge of the hinged device separately from the first plate.

9. The hinged device testing system of claim 8, wherein the second plate is configured to hold a second side of the first hinge, such that the first hinge controls a folding path of the hinged device under test as the first drive arm moves the second plate.

10. The hinged device testing system of claim 8, further comprising a second hinge support plate configured to hold a first side of a second hinge of the hinged device separately from the first plate.

11. The hinged device testing system of claim 1, further comprising a flexure configured to limit movement of the first plate in directions parallel to a plane of the first surface and to transfer loads from the first plate in a direction perpendicular to the plane of the first surface.

12. The hinged device testing system of claim 11, further comprising a base plate and a bracket coupled to the base plate, wherein the flexure is supported by the bracket.

13. The hinged device testing system of claim 11, further comprising a support bracket, wherein the support bracket couples the flexure to the first plate.

14. The hinged device testing system of claim 13, further comprising a stopping block, wherein the stopping block is configured to stop the support bracket after a predetermined amount of travel of the support bracket.

15. A hinged device testing system, comprising:
   a first plate comprising a first surface configured to hold stationary a first side of a hinged device under test;
   a second plate comprising a second surface configured to hold a second side of the hinged device under test;
   a first drive arm coupled to the second plate and configured to cause the second plate to rotate about a hinge pivot axis of the hinged device under test; and
   a translation linkage configured to limit movement of the first plate in directions parallel to a plane of the first surface and to transfer loads from the first plate in a direction perpendicular to the plane of the first surface.

16. The hinged device testing system of claim 15, further comprising a first cam follower coupled to the second plate, wherein the first drive arm is coupled to the second plate by being coupled to the first cam follower, and the first drive arm is configured to cause the second plate to rotate by moving the first cam follower.

17. The hinged device testing system of claim 15, further comprising an actuator configured to rotate the first drive arm.

18. The hinged device testing system of claim 15, further comprising a load cell configured to measure loads on the first plate while the first drive arm rotates the second plate.

19. A method for testing a hinged device comprising a first side, a second side, and a hinge coupling the first side and the second side, the method comprising:
   securing the first side of the hinged device on a first surface of a first plate;
   securing the second side of the hinged device on a second surface of a second plate;
   exerting a load on a load cell by rotating, using a first drive arm coupled to the second plate, the second plate about a hinge pivot axis in a first rotation, wherein:
      the hinge pivot axis is defined by the hinge of the hinged device to exert a load onto the first plate,
      the first rotation of the second plate exerts the load on the first plate, and
      the load is transferred from the first plate to the load cell by a translation linkage coupled to the first plate; and
   measuring the load using the load cell.

20. The method of claim 19, further comprising limiting movement of the first plate in directions parallel to a plane of the first surface of the first plate, wherein the translation linkage transfers the load from the first plate to the load cell in a direction perpendicular to the plane of the first surface.

* * * * *